B. C. ZUHARS AND H. D. CLARKE.
DEMOUNTABLE COUPLE GEAR BEARING CAP.
APPLICATION FILED FEB. 6, 1920.
1,360,858.    Patented Nov. 30, 1920.
3 SHEETS—SHEET 3.
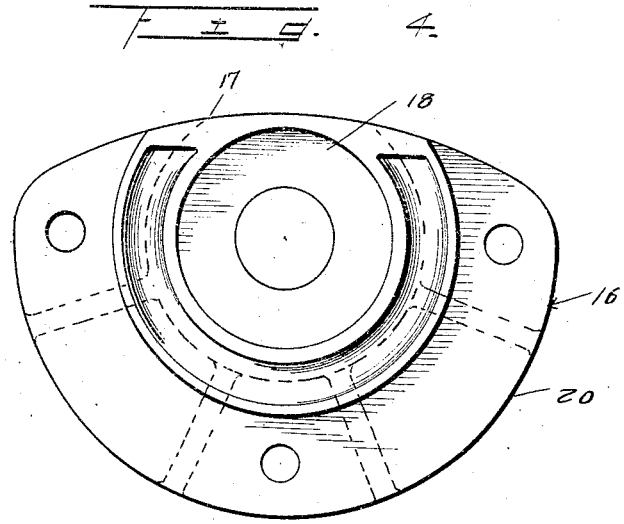
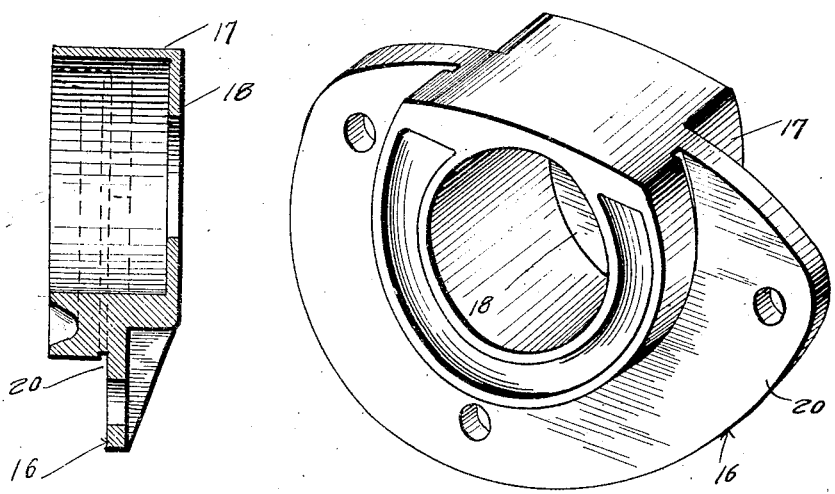
Inventors
B. C. Zuhars.
H. D. Clarke.
By
Attorney

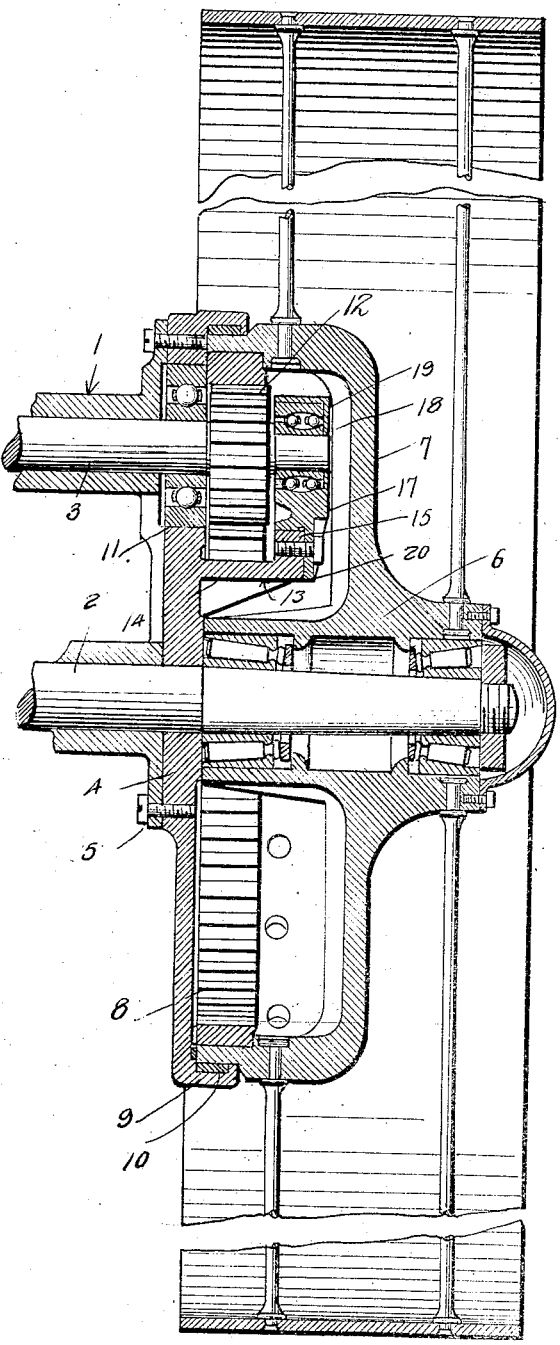

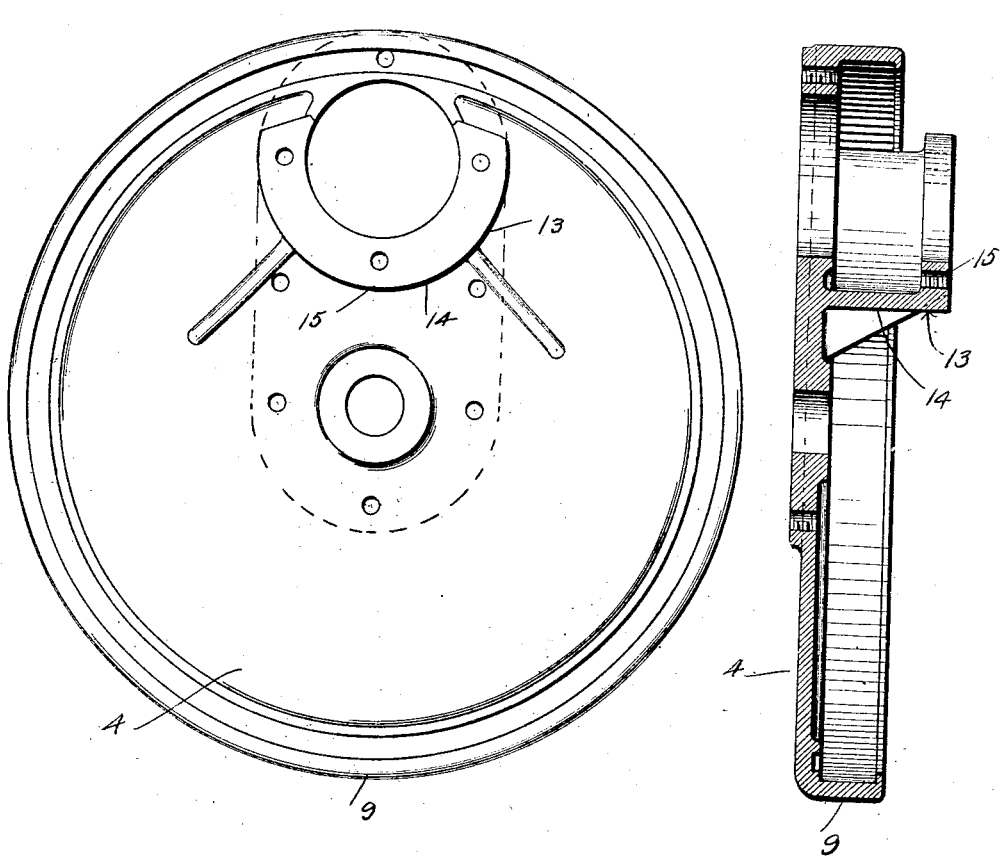

UNITED STATES PATENT OFFICE.

BENJAMIN C. ZUHARS AND HARRY DON CLARKE, OF COLUMBUS, OHIO, ASSIGNORS TO THE OHIO TRACTOR COMPANY, OF COLUMBUS, OHIO, A CORPORATION OF OHIO.

DEMOUNTABLE COUPLE-GEAR BEARING-CAP.

1,360,858.

Specification of Letters Patent.    Patented Nov. 30, 1920.

Application filed February 6, 1920. Serial No. 356,743.

*To all whom it may concern:*

Be it known that we, BENJAMIN C. ZUHARS and HARRY D. CLARKE, citizens of the United States, residing at Grand View Heights, Columbus, in the county of Franklin and State of Ohio, have invented certain new and useful Improvements in Demountable Couple-Gear Bearing-Caps; and we do hereby declare the following to be a full, clear, and exact description of the invention, such as will enable others skilled in the art to which it appertains to make and use the same.

This invention relates to new and useful improvements in demountable couple-gear bearings particularly adaptable for internal gear construction and has for one of its objects the provision of means whereby the outer ends of the drive axles of a motor vehicle or tractor are firmly supported and which will permit the easy removal of the axles from the differential housing after the wheels are removed or detached, thereby providing full floating power delivering axles.

Another object of this invention is the provision of a demountable couple-gear bearing of the character stated which supports the axles on each side of the drive pinions which keeps them in true alinement with the internal ring gears of the wheels, thereby increasing the life of said pinions and gears.

A further object of this invention is the provision of cups adapted to receive the drive pinions and catch lubricant from the ring gears during their rotation, so that said pinions are continuously bathed in lubricant and which permits the pinions to deposit lubricant on the ring gears at their points of mesh with said ring gears, thereby increasing the life of said pinions and gears.

With these and other objects in view as will become more apparent as the description proceeds, the invention consists in certain novel features of construction, combination, and arrangement of parts as will be hereinafter more fully described and claimed.

For a complete understanding of our invention, reference is to be had to the following description and accompanying drawings, in which:

Figure 1 is a vertical sectional view illustrating a demountable couple-gear bearing cap associated with a wheel and constructed in accordance with our invention, Fig. 2 is a front elevation illustrating a guard plate having formed integrally therewith a lubricant receiving cup, Fig. 3 is a vertical sectional view of the same, Fig. 4 is an elevational view, looking at the inner face of a cap, Fig. 5 is a vertical sectional view of the same, Fig. 6 is a perspective view drawn on an enlarged scale illustrating the cap.

Referring in detail to the drawings, the numeral 1 indicates a fragmentary portion of a differential housing having load and drive or power axles 2 and 3 respectively and a guard plate 4 is secured to the end of the differential housing 1 by fasteners 5 and is provided with openings to permit the load and power axles 2 and 3 respectively to extend therethrough. A wheel 6 forming subject matter for a co-pending application is journaled on the axle 2 and has secured in the hub 7 thereof a ring gear 8. An annular flange 9 is formed on the guard plate 4 and overlies the hub 7 and is provided with packing 10 which establishes a leak-proof connection between the hub and the guard plate 4 to prevent lubricant within the hub from escaping.

A bearing 11 is mounted in the guard plate 4 and rotatably supports the power or drive axle 3 at a point where said axle passes through the guard plate. A drive pinion 12 is secured to the power or drive axle 3 and meshes with the internal gear 8 at its highest point and said drive or power axle 3 projects beyond said pinion as clearly illustrated in Fig. 1.

A cup 13 is formed integrally with the guard plate 4 about the drive or power axle opening and includes a substantially arcuate shaped wall 14 which defines top and end openings to the cup so that the drive pinion 12 located in the cup can mesh with the ring gear 8 by way of the top opening and said top opening also permits lubricant to drop into the cup from the ring gear during the rotation thereof. An arcuate shaped flange 15 is formed on the outer edge of the arcuate shaped flange 14 and defines the end opening to the cup. A cap 16 is detachably secured to the flange 15 by fasteners and is adapted to close the end opening and consists of a hollow body 17 which has one end closed by an end wall 18 while its other end is open to receive the outer end of the drive or power axle 3. A bearing 19 is located in the body 17 and rotatably supports the outer end of the drive or power axle 3 and coöperates with the bearing 11 in keeping the drive pinion 12 in true alinement with the ring gear 8 thus preventing irregular wearing of the teeth of the gear and pinion. The body 17 seats on the flange 15 and said body has formed thereon an attaching flange 20 which overlies the flange 15 and is detachably secured thereto.

The heretofore described construction, permits the drive or power axle to be readily withdrawn from the differential housing and the usual differential located therein as it is only necessary to remove the cap 16 after the removal of the wheel 6 and the axle 3 can then be pulled out. This construction also readily catches the lubricant brought up by the rotation of the ring gear 8 and continuously bathes the drive pinion, permitting said pinion to deposit lubricant onto the ring gear at its point of mesh with said ring gear and which is the highest point of said ring gear. Also this construction prevents the drive pinion from becoming out of alinement with the ring gear 8 thus increasing the life of the gear and pinion.

While we have shown and described the preferred embodiment of our invention, it will be understood that minor changes in construction, combination, and arrangement of parts may be made without departing from the spirit and scope of the invention as claimed.

Having thus described our invention, what we claim is:—

1. A device of the character set forth comprising a plate, power and load carrying axles extending through the plate, a wheel journaled on said load carrying axle, a gear secured to the wheel, a pinion secured to the power axle and in mesh with the gear, means supporting the power axle at one side of the pinion, a lubricant receiving cup carried by said plate and inclosing a portion of the pinion, means detachably secured to the cup for supporting the power axle at the opposite side of the pinion and capable of being removed to permit the power axle to be withdrawn without the removal of the pinion.

2. A device of the character set forth comprising a plate, power and load carrying axles extending through the plate, a wheel journaled on said load carrying axle, a gear secured to the wheel, a pinion secured to the power axle and in mesh with the gear, a bearing carried by said plate and rotatably supporting the power axle at one side of the pinion, a lubricant cup carried by the plate and receiving the pinion and having its top and one end open, a cap removably secured to the cup and closing the end thereof, and a bearing carried by said cap and supporting the power axle at the other side of the pinion.

3. A device of the character set forth comprising a guard plate, power and load carrying axles extending through the plate, a wheel journaled on said load carrying axle, a flange formed on the guard plate and overlying the hub of the wheel, an internal gear secured in the hub of the wheel, the hub of the wheel adapted to contain lubricant for the gear, a pinion secured to the power axle and in mesh with the gear at its highest point, a bearing carried by the guard plate and rotatably supporting the power axle at one side of said pinion, a cup formed on said plate and receiving said pinion and adapted to catch lubricant from the gear during the rotation thereof, and a removable bearing cap carried by said cup and supporting the power axle at the opposite side of said pinion.

4. A demountable couple gear bearing cap comprising a plate having power and load carrying axles associated therewith, a bearing between the plate and power axle, a drive pinion cup on said plate and having its top and front walls open, a cap detachably secured to the cup and closing the front wall thereof, and a bearing in said cap for supporting the power axle.

5. A demountable couple gear bearing cap comprising a plate having power and load carrying axles associated therewith, a bearing between the plate and power axle, a drive pinion cup on said plate and having openings in its top and front walls, a cap resting on the wall of the front opening and having a bearing chamber, a bearing in said chamber and supporting the power axle, and means detachably securing the cap to said cup.

6. A demountable couple gear bearing cap comprising a plate having power and load carrying axles associated therewith, a bearing between the plate and power axle, a drive pinion cup on said plate and having openings in its top and front walls, a cap resting on the wall of the front opening and having a bearing chamber, a bearing in said chamber and supporting the power axle, and a flange formed on said cap and detachably secured to the cup.

7. A demountable couple gear bearing cap comprising a plate having power and load carrying axles associated therewith, a bearing between the plate and power axle, a drive pinion cup on said plate and having openings in its top and front walls, a cup resting in the front opening and extending beyond the cup and having a bearing chamber, a bearing in said chamber and supporting the power axle, a flange formed on the cap and abutting the front face of said cup, and means detachably securing the flange to the cup.

8. A demountable couple gear bearing cap comprising a wheel hub closing plate secured to a differential housing and having power and load carrying axles extending therethrough, a bearing between the plate and power axle, a drive pinion cup formed integrally with the plate and a bearing cap detachably secured to the cup and supporting the power axle.

In testimony whereof we affix our signatures in presence of two witnesses.

BENJAMIN C. ZUHARS.
HARRY DON CLARKE.

Witnesses:
WILLIAM F. GARRETT,
JAMES F. LAUGHRAD.